Patented Mar. 23, 1926.

1,577,981

UNITED STATES PATENT OFFICE.

WOLFGANG OTTO, OF NEUMUHLEN, NEAR KIEL, GERMANY, ASSIGNOR TO THE NEDERLANDSCHE TECHNISCHE HANDEL MAATSCHAPPIJ "GIRO," OF S'GRAVENHAGE, NETHERLANDS.

RESISTANCE ELEMENT.

No Drawing. Application filed February 14, 1924. Serial No. 692,680.

*To all whom it may concern:*

Be it known that I, WOLFGANG OTTO, a citizen of Germany, residing at Neumuhlen, near Kiel, Germany, Heikendorfer Weg 9, have invented new and useful Improvements in Resistance Elements, of which the following is a specification.

This invention relates to an improved electric conducting or resistance material consisting of a finely divided mixture of an insulating material and of a material which is a good conductor. According to the invention, rubber vulcanized to a greater or less degree of hardness is used as the insulating material, finely powdered graphite being added to it before vulcanizing. Experiments have shown that when Ceylon graphite is used, it is sufficient to add a relatively small fraction of the total weight, provided that care is taken to have the graphite very finely ground and the mass carefully and thoroughly mixed before vulcanizing. In that way a perfectly uniform conducting material is produced.

As the amount of graphite required does not exceed the proportion that may be added to a good rubber mixture as a filling body, it follows that as regards its mechanical properties the new material can be made equal to most known commercial qualities of vulcanized soft or hard rubber as may be required. In view of the relatively small addition of graphite it is further possible to put on before vulcanizing, covering layers of better or worse conducting or insulating rubber, owing to which the field of application for the new invention becomes exceedingly wide.

It has been proposed heretofore to make electric resistance material out of a mixture of sharp carbon particles, such as retort carbon, and gutta-percha or rubber. It has always been considered essential that the sharp carbon particles should penetrate through the mass so as to engage each other at their edges and points. It has even been asserted that a material consisting of very finely divided graphite or carbon and rubber must necessarily be a non-conductor of electricity because of the fact that the particles do not have sharp edges of sufficient magnitude to penetrate through the mass into contact with corresponding projections on adjacent particles. The present invention is based on the discovery that a material having a comparatively high degree of conductivity can be made by mixing extremely finely divided graphite and rubber. Although there is apparently no physical contact between adjacent particles of graphite, yet the material is capable of conducting electricity and forms an excellent resistance material.

The new material can be used in a number of different ways as an electric resistance material, for all purposes, in the same way as already known resistance materials. If it is made in the form of bars, it can be used for instance for exact measurements of resistance. The transition resistance at the ends must be in such cases negligible, and to that end the bar, with the exception of the end faces, can be coated with a thin layer of pure rubber or other insulating material, and then the end faces copperplated by electrolysis, the copper, in spite of the slight admixture of graphite, forming a perfectly uniform coating.

When using softly vulcanized rubber, the material can be made in the form of threads. These soft rubber threads can then be used directly as resistances, for example, in receivers for wireless telegraphy, of the magnitude of about 0.5—5 megohm, for the purpose of equalizing potentials or carrying away static charges.

A soft rubber thread according to the invention, with about 20% by weight graphite addition, a cross-section of 1 sq. mm. and a length of about 10 cm., has according to the quality of the graphite added a resistance between 0.7 and 1.5 megohm. If therefore it is desired to produce a given resistance, it is merely necessary to cut off a corresponding length of the rubber thread.

The thread can be used either uncovered or covered with a layer of pure insulating rubber. In the former case, the terminals must be arranged so that the clamped thread does not come in contact with any solid body or only with highly insulating bodies, whilst in the second case any desired arrangement may be used. Owing to the elasticity of rubber, it is easy, when using the new material, to obtain a good connection to circuits by means of cable shoes, binding screws or the like means which exercise a certain pressure. If the resistance possesses a coating of insulating rubber, the latter has to be first removed at the ends for instance by washing it off with benzene, or the connection could be effected by means of a needle which is inserted into the conducting core. By inserting the needle to a greater or less depth, it is possible to effect a fine adjustment of the resistance.

For the purpose of being used as "heat bandages" longitudinal strips of the new material to which a moderate conductivity has been given, are covered, before the vulcanization, at the end faces with a mixture of graphite and rubber, of the greatest possible conductivity, in which is embedded a supply strand, whereupon all the surfaces are given a non-conducting covering. In that way, after the vulcanization of bandage is obtained which can be placed without any danger to a patient, directly on his skin, even when the said bandage is moist and which can be sterilized by boiling.

A distinguishing feature of the new material is that it has outwardly all the properties of rubber, that is to say can be vulcanized hard or soft and placed on other bodies in very thin layers or in the form of thin plates and firmly adheres to their surface, closing them outwardly in an absolutely tight manner, but at the same time conducting electricity to a greater or less extent according to the proportion of graphite. This peculiar property results in a particularly important application. The material can be used for covering or coating the surface of bodies which as electrodes are intended to transmit electric currents to a surrounding medium, and thereby protect the said surfaces from the destructive chemical or electro-chemical action.

This application of the invention constitutes for many branches of industry a considerable progress. Thus experience shows that when introducing electric currents into liquid by means of metal electrodes, the latter are nearly always more or less strongly corroded. Even the so-called precious metal, silver does not form an exception, whilst gold and platinum are out of the question for most purposes on account of their high price. Therefore hitherto it has been necessary to use for such purposes carbon or graphite electrodes that is to say materials very difficult to work and of very inferior durability from the mechanical point of view. Such carbon and graphite electrodes can now be replaced by metal electrodes of any desired suitable shape and size such as may be required for any particular purpose, covered on all sides with the conducting rubber according to this invention. This mass is put on in a thin layer and in soft condition, whether in the form of the so called "painting rubber," or of thin plates. After the vulcanizing which is preferably done hot, and not cold, the metal is protected by the rubber from any electrochemical action or injury, whilst the electric current can pass in or out through the thin coating without any perceptible loss of energy, provided that the surface is large enough.

In many cases it will be advisable to put the conducting rubber only on one side (when it is question of plates) or in certain limited zones, and to protect the remaining surface of the body by ordinary insulating rubber. Experiments have shown that graphitized conducting rubber combines, without leaving any gaps, with the insulating rubber, that is to say, as far as machining is concerned, it represents a homogeneous body, and that both kinds of rubber adhere to the metal equally firmly, so that on the whole a mechanically strong body is obtained.

The application of the invention is not limited to electrodes which are dipped into a liquid in the narrower sense of the word. Thus for instance it is a difficult problem to protect bare earth returns for heavy currents, earthing wires in telephony and telegraphy, lighting conductor, earth cables and the like from chemical and electrochemical destruction. The coating according to the present invention affords an excellent solution of the said problem as the coating behaves in chemical respects as rubber, and in electric respect as a conductor. Also for electrodes which are placed in gaseous mediums, such as lighting conductor points, electrodes for chemical gas purification installations etc., the provision of such a coating is of the greatest importance.

In characterizing my improved material as a resistance material, I wish it to be understood that I refer to a material which is capable of conducting electricity, as distinguished from an insulating material. Rubber is, of course, an insulating material, but my improved product consisting of rubber and finely divided graphite, is capable of conducting electricity and is, therefore, properly termed a resistance material. It is to be understood that the expression "finely divided" used throughout the description and claims to characterize the graphite which forms a part of my improved material, is intended to define graphite in the form of an impalpable powder as distinguished from retort carbon or other forms of carbon having sharp edges and points capable of penetrating rubber to an appreciable extent.

What I claim is:

1. As an article of manufacture, an electric resistance material composed of at least partially vulcanized rubber and finely divided graphite embedded therein, the said material having the physical properties of rubber.

2. As a new article of manufacture, an electric resistance element, a portion of which consists of a mixture of finely divided graphite and at least partially vulcanized rubber in certain proportions and a portion of which consists of a mixture of finely divided graphite and rubber in different proportions, the graphite in at least one of said portions being embedded in the rubber.

3. As a new article of manufacture, an electric resistance element comprising vulcanized rubber and finely divided graphite, and a layer of non-conducting material fixed to a portion of the rubber and graphite composition.

4. As a new article of manufacture, an electric resistance element, a portion of which consists of a mixture of finely divided graphite and rubber in certain proportions and a portion of which consists of a mixture of finely divided graphite and rubber in different proportions, and a coating of non-conducting material firmly adhering to the rubber and graphite composition.

5. As a new article of manufacture, an electric resistance element comprising a composition consisting of vulcanized rubber and finely divided graphite, a coating of non-conducting material firmly adhering to portions of said composition and a coating of conducting material firmly adhering to other portions of said composition.

6. As a new article of manufacture, an electric resistance element comprising a composition consisting of vulcanized rubber and finely divided graphite, a layer of vulcanized rubber adhering to a portion of said composition and a layer of electrolytically deposited metal adhering to another portion of said composition.

7. A resistance element comprising a composition consisting of vulcanized rubber and finely divided graphite, and solid electrical conductors firmly embedded in the vulcanized composition.

8. As a new article of manufacture, an electrode comprising a solid conducting member and a layer of material firmly adhering to this member, said layer comprising a composition of vulcanized rubber and finely divided graphite.

9. As a new article of manufacture, an electrode comprising a solid conductor, a layer of vulcanized rubber adhering to a portion of said conductor and a layer of material adhering to another portion of said conductor, the said material consisting of vulcanized rubber and finely divided graphite.

10. As a new article of manufacture, an electric resistance element comprising a composition consisting of vulcanized rubber and finely divided graphite, and a layer of rubber vulcanized to at least a portion of the rubber and graphite composition.

11. As a new article of manufacture, an electric resistance element, a portion of which consists of a mixture of finely divided graphite and rubber in certain proportions and a portion of which consists of a mixture of finely divided graphite and rubber in different proportions, and a coating of rubber vulcanized to the rubber and graphite composition.

12. An electric conducting unit comprising a solid electric conductor, a layer of vulcanized rubber adhering to a portion of said conductor, and finely divided graphite distributed throughout said layer, rendering the same capable of conducting electric current.

13. As a new article of manufacture, an electric resistance material composed of at least partially vulcanized rubber and finely powdered Ceylon graphite embedded therein, the said material having the physical properties of rubber.

14. As a new article of manufacture, an electric resistance material comprising at least partially vulcanized rubber and finely powdered graphite distributed throughout the rubber and embedded therein, the amount of graphite being not greater than the amount of filler ordinarily employed in making vulcanized rubber.

15. As a new article of manufacture, a material comprising a continuous thread of vulcanized rubber and finely divided graphite uniformly distributed throughout the rubber, the said material being capable of conducting electric current and of serving as a resistance material.

16. As a new article of manufacture, an electric resistance material comprising a continuous thread of vulcanized rubber and finely divided graphite distributed uniformly throughout the rubber, and a coating of insulating rubber, vulcanized to the said rubber thread.

17. A variable resistance unit, comprising resistance material composed of at least partially vulcanized rubber and finely powdered graphite distributed throughout the rubber and a sharp electrical conductor adapted to be thrust into the rubber to vary the resistance of the unit.

In testimony whereof I have signed my name to this specification.

WOLFGANG OTTO.